Figure 1:
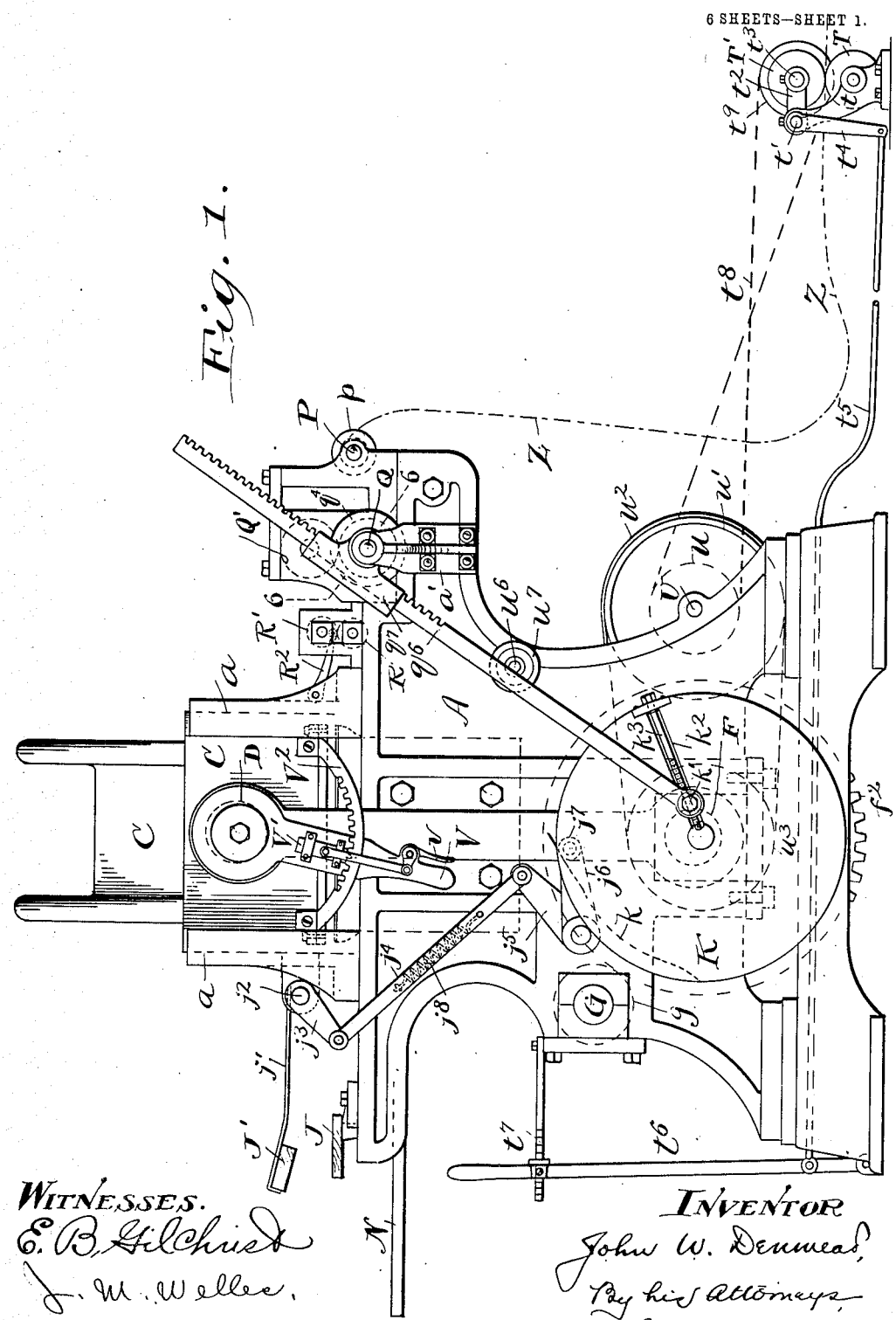

No. 871,487. PATENTED NOV. 19, 1907.
J. W. DENMEAD.
MACHINE FOR MAKING PAPER BOX BLANKS.
APPLICATION FILED MAY 21, 1904.

6 SHEETS—SHEET 1.

WITNESSES.
E. B. Gilchrist
J. M. Welles

INVENTOR
John W. Denmead,
By his Attorneys,
Thurston & Bates

No. 871,487. PATENTED NOV. 19, 1907.
J. W. DENMEAD.
MACHINE FOR MAKING PAPER BOX BLANKS.
APPLICATION FILED MAY 21, 1904.

6 SHEETS—SHEET 3.

WITNESSES.
E. V. B. Gilchrist
J. A. Weller

INVENTOR
John W. Denmead,
By his Attorneys,
Thurston & Bates.

WITNESSES.
E. B. Gilchrist
J. M. Welles

INVENTOR.
John W. Denmead
By his Attorneys,
Thurston & Bates

No. 871,487. PATENTED NOV. 19, 1907.
J. W. DENMEAD.
MACHINE FOR MAKING PAPER BOX BLANKS.
APPLICATION FILED MAY 21, 1904.

6 SHEETS—SHEET 6.

UNITED STATES PATENT OFFICE.

JOHN W. DENMEAD, OF AKRON, OHIO, ASSIGNOR TO THE K. D. BOX AND LABEL COMPANY, OF CLEVELAND, OHIO, A CORPORATION OF OHIO.

MACHINE FOR MAKING PAPER-BOX BLANKS.

No. 871,487.　　　Specification of Letters Patent.　　　Patented Nov. 19, 1907.

Application filed May 21, 1904. Serial No. 208,992.

*To all whom it may concern:*

Be it known that I, JOHN W. DENMEAD, a citizen of the United States, residing at Akron, in the county of Summit and State of Ohio, have invented a certain new and useful Improvement in Machines for Making Paper-Box Blanks, of which the following is a full, clear, and exact description, reference being had to the accompanying drawings.

The object of this invention is to provide an efficient machine for the rapid and automatic production of knockdown paper boxes. The machine accomplishes this automatically by intermittently feeding through the machine a continuous web of paper, and cutting and scoring it with suitable knives or rules locked in a chase and operating against a flat platen to partially sever the blank, after which the blanks are automatically separated from the web following. I am not aware of any previous machine which accomplishes this.

Heretofore, so far as I am aware, the machines have either required male and female punches, which are expensive to make, or paper previously cut into sheets has been manually fed to an impressing mechanism, after which the margins have been broken off by hand. This latter method entails a slow operation, a waste of paper at the margins, and danger to the operator. In my machine, by having a break-off mechanism, which may be varied according to the contour of the blank and operating concurrently with a subsequent cutting and scoring impression, I am enabled to use the continuous automatic paper feed, with a cheaply arranged pressing mechanism. This is one of the vital features of the present invention.

If the blanks are large, the part severed by the break-off mechanism may be a single blank. With small boxes, however, several blanks will be in each severed portion; thereafter these blanks are simply broken up into sections on the properly scored lines, leaving knockdown boxes, which need only to be folded on their scored lines, and in some cases pasted to make a complete box.

Other features of my invention comprised in this application are the mechanism for feeding and controlling the paper, and the mechanism for adjusting and throwing out of action the impression stroke. All of these features are hereinafter more fully described and definitely set out in the claims.

Figure 2:
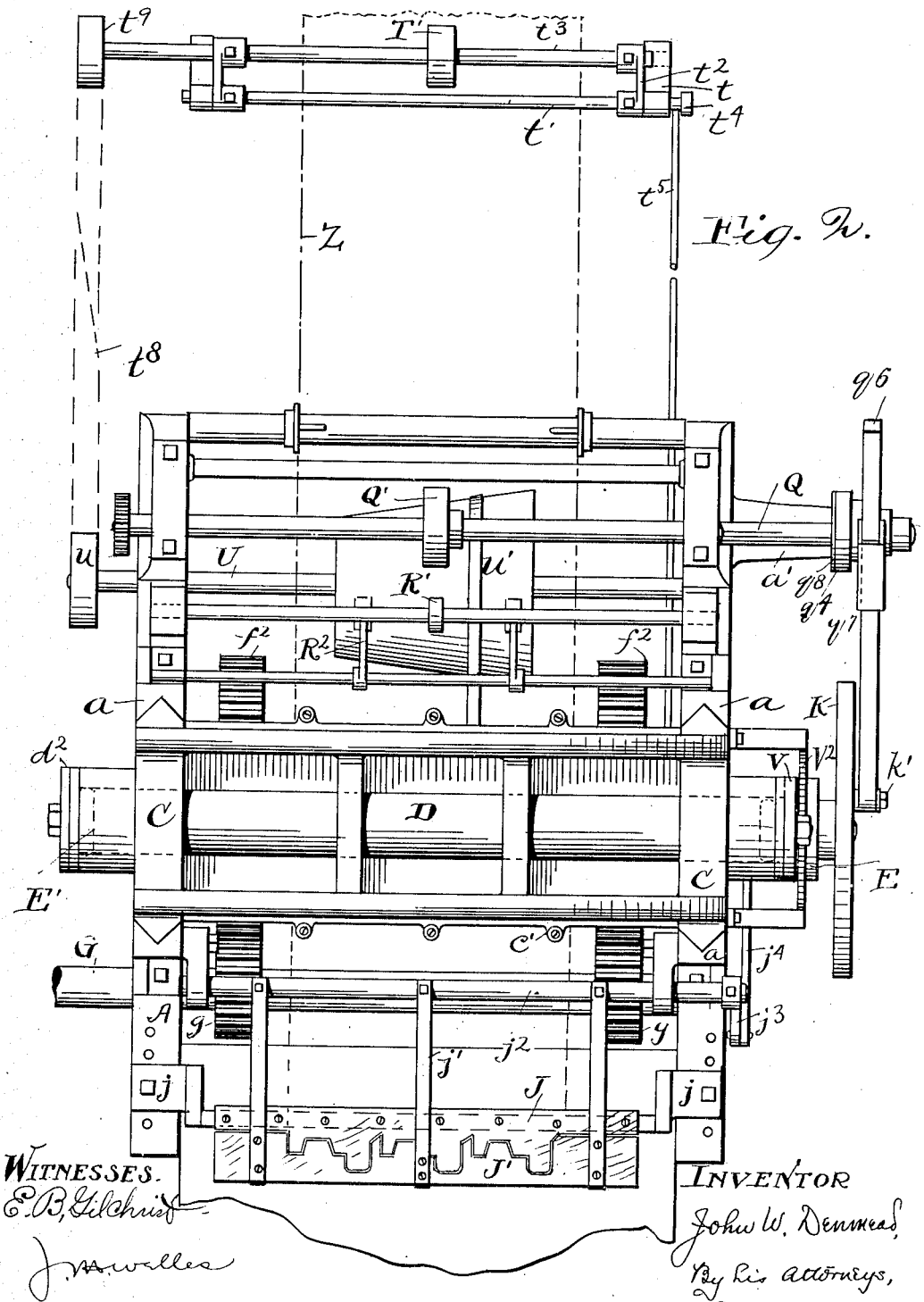
Figure 3:
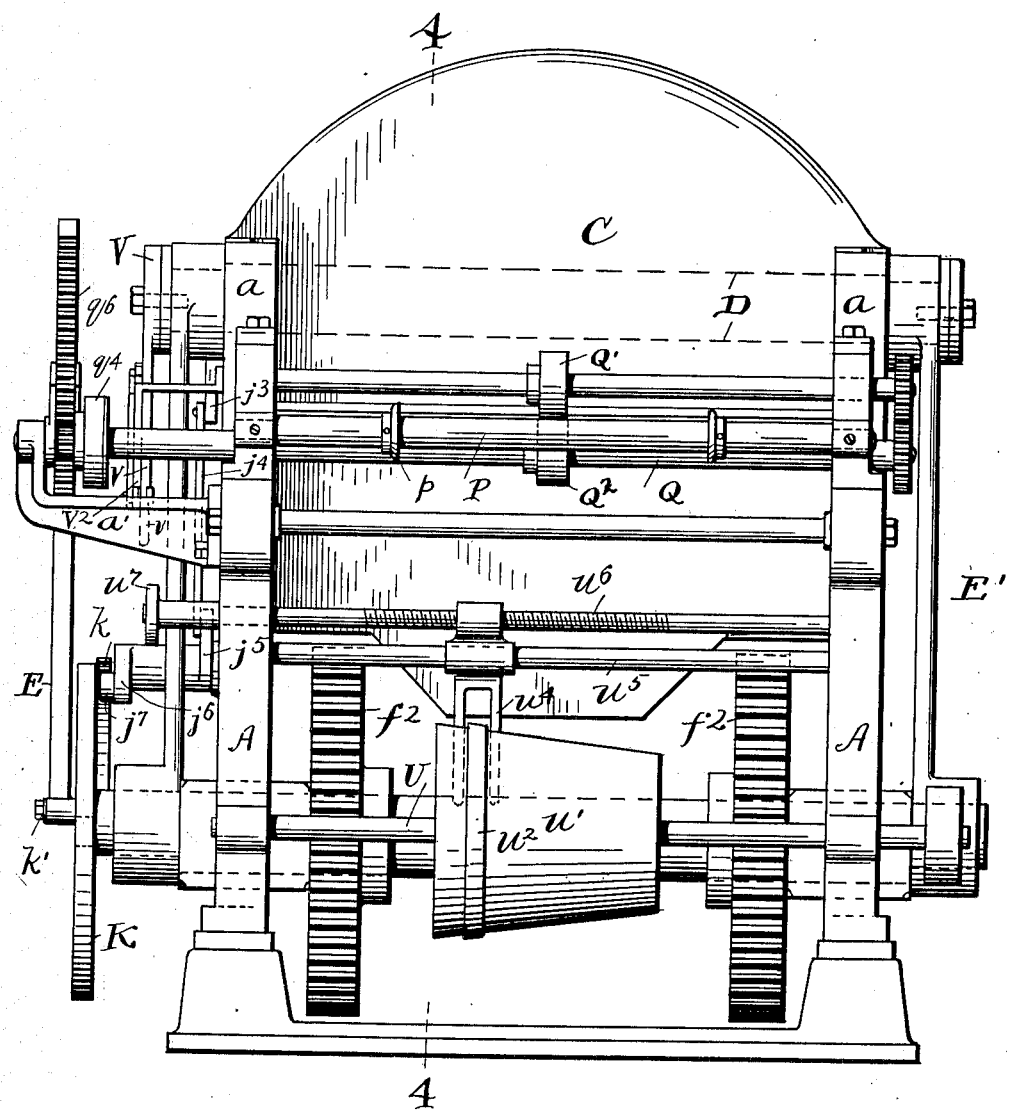
Figure 4:
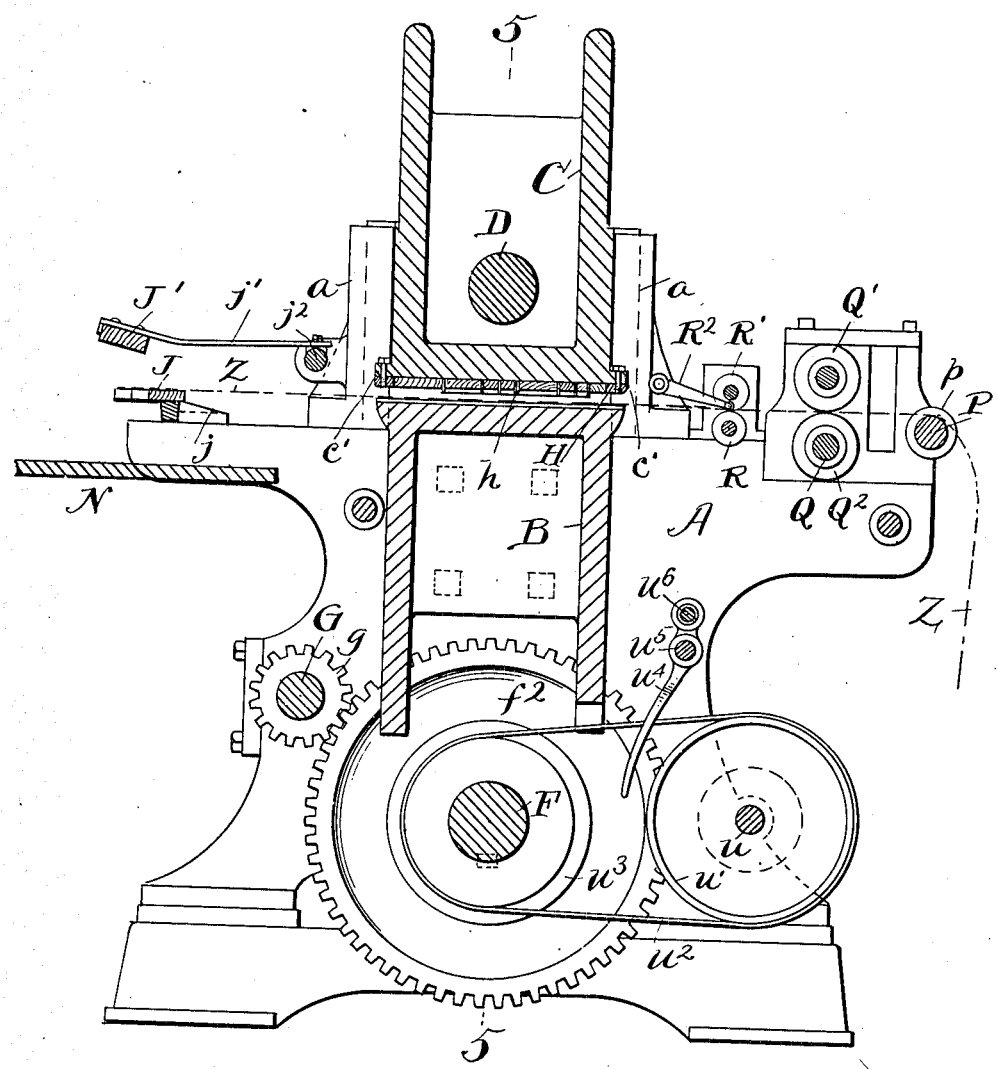
Figure 5:
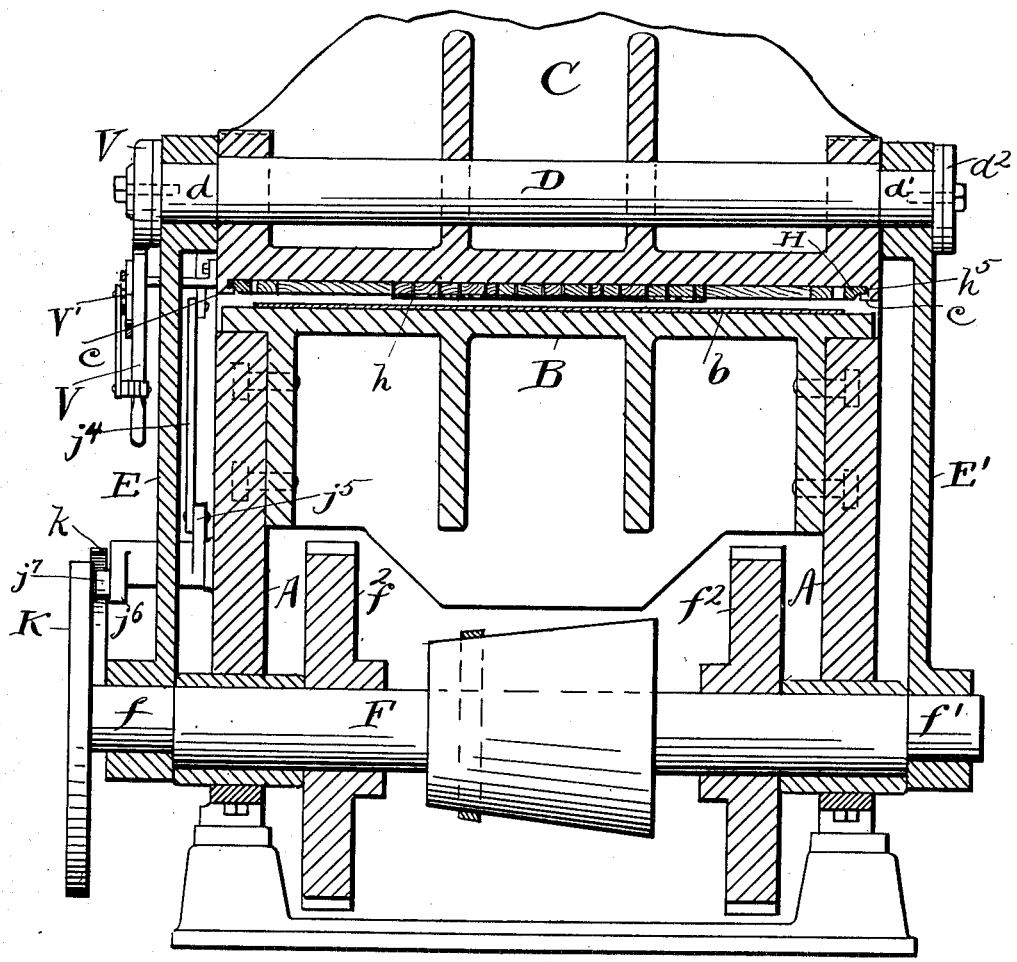
Figure 6:
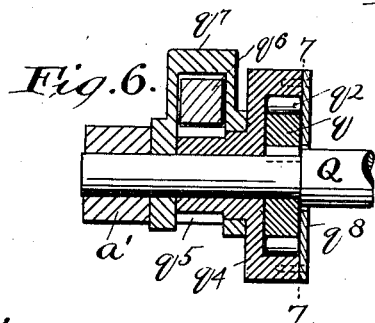
Figure 7:
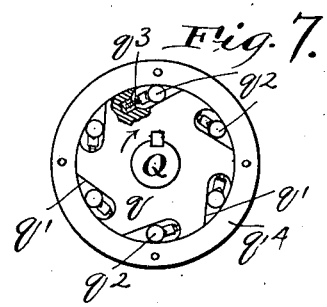
Figure 9:
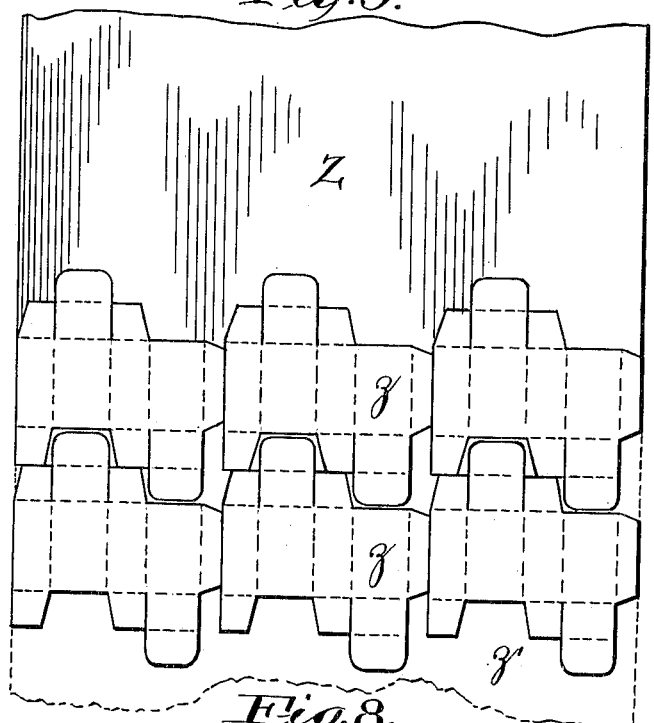
Figure 8:
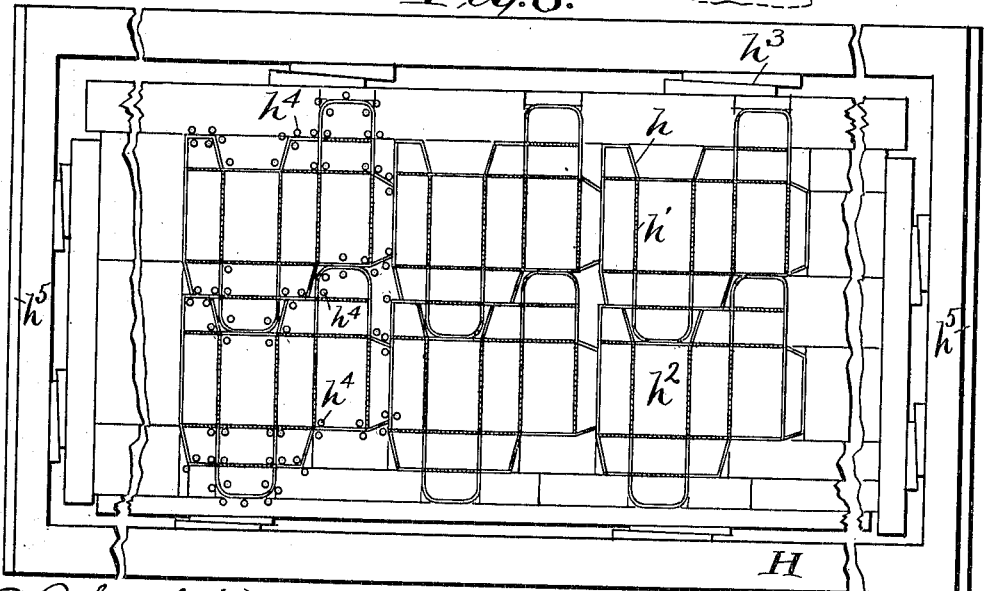

In the drawings, Figure 1 is a side elevation of my machine complete; Fig. 2 is a plan thereof; Fig. 3 is a rear elevation, omitting the gripping mechanism of the continuous paper feed; Fig. 4 is a longitudinal vertical section, substantially on the line 4—4 of Fig. 3; Fig. 5 is a transverse vertical section through the operating shaft, as indicated by the line 5—5 in Fig. 4; Figs. 6 and 7 are details of the intermittent feed, Fig. 6 being cross-section on the lines 6—6 of Fig. 1 and Fig. 7 a face view of the ratchet, as indicated by the line 7—7 of Fig. 6; Fig. 8 is a bottom plan of the chase and its inclosed cutting and scoring knives or rules; Fig. 9 is a top plan of the blanks just produced and still connected with the web of paper there following.

The frame of the machine comprises a suitable base having two upright frame standards, A. Between these standards and secured to them is the bed B, shown as suitably ribbed on its under side. Slidable in ways $a$ carried by the frame standards and above the bed is the reciprocating head C. This head is suitably strengthened by cross ribs and is carried by a through shaft D. The projecting ends $d$, $d'$ of this shaft are journaled in the upper ends of bars E, E' respectively, which at their lower ends surround eccentric projections $f$, $f'$ on opposite ends of the main operating shaft F, which has its bearings carried by the standards A. From this it results that if the shaft F is rotated the head C is reciprocated vertically.

To drive the shaft F, I provide a main driving shaft, G, which receives power in some suitable manner and carries a pair of pinions $g$, $g$ meshing with the pair of gears $f^2$, $f^2$ on the shaft F.

The knives or rules which do the cutting and scoring are carried on the under side of the head, and thus with that head and the coöperating bed constitute what may be called an impression mechanism. These knives or rules are set up in proper form in a suitable chase. This chase is shown in bottom plan in Fig. 8. It consists of an ordinary rectangular frame H. The cutting knives $h$ have chisel shaped faces and are indicated by simple parallel lines; the scoring knives $h'$ are blunt and are conventionally represented by cross lines between parallel lines. The various knives are suitably held between wooden furniture $h^2$, and the whole is clamped in place by suitable wedges $h^3$. In order to force the paper away from the cutting knives after they have operated, suitable resilient material, preferably cork, is mounted on the furniture adjacent to these knives. Some of these corks being indicated at $h^4$ in Fig. 8. This arrangement of blocking up the knives in a chase is a common construction.

The chase is slid into place in the under side of the head C. It has rabbeted edges $h^5$ taking over inwardly projecting ribs $c$ on the head as shown in Fig. 5. Suitable strips $c'$ shown in Fig. 4 and clamped to the head by screw bolts prevents any forward or backward movement to the chase. To take out the chase the forward strip $c'$ is removed and the chase slid out.

The paper Z is fed from a continuous roll, not shown, by suitable means to be hereinafter described, between the chase and the impression plate $b$ resting on the upper face of the bed as the head comes down in its reciprocation. The paper is thus cut and scored according to the form described as indicated at $z$ in Fig. 9. Thereafter it is fed forward by steps just equal to the longitudinal depth of the blank.

The cutting and scoring does not entirely sever the blank from the paper web, wherefore the action of the feeding mechanism in shoving forward the web shoves out in front of the machine the blank thus cut and scored. At the proper point in advance of the head, I provide a break-off mechanism, adapted to the contour of the blank impressed. This break-off mechanism, as shown, consists of a pair of coöperating bars, J, J', the former of which is stationarily held by a suitable bar $j$ mounted on the frame standards A, and the latter of which is carried by spring arms $j'$ extending from a rock shaft $j^2$. This rock shaft is mounted in suitable brackets and is operated by an arm $j^3$ connected by a link $j^4$ with a rock arm $j^5$. Rigid with this rock arm is an arm $j^6$ which has a roller $j^7$ adapted to be engaged and depressed by a cam $k$ on a disk K secured to the end of the shaft F. The bar J' is normally held before the bar J as indicated in Fig. 1 by the spring $j^8$ connected to the link $j^4$. At the proper time, however, the cam $k$, operating through the mechanism described, brings down the bar J, which severs the foremost blank.

The bars J, J' are located a definite distance in advance of the form on the chase,—a distance which is either equal to, or some integral multiple of, the depth of the form lengthwise of the web. As shown in the drawing, the operating edge of the bars J, J' is in advance of the rearmost line, being cut by the knives in the chase three times the depth of the blank. It thus results that after one blank is impressed, the paper being advanced a distance equal thereto, a contiguous second and then third blank is impressed, while the first one (indicated by dotted lines $z'$, in Fig. 8) is idle in advance of the chase and behind the bars J, J', but while the fourth blank is being impressed (as the parts are adjusted in the drawing) the rearmost edge of the first blank has just come into alinement with the operating edges of the bars J, J', wherefore the depression of bars J, breaks off the foremost blank.

By reason of the arms $j'$ being resilient, the bar J' delivers something of a blow to the foremost blank, which severs it and allows it to fall upon the table N carried by the frame standards. By reason of delivering this blow, and the previous cutting of the blank so that it is almost, but not quite, dissevered, I am enabled to separate the finished blanks without the necessity of providing an accurate edge for shearing them. In fact, I have found that the bars J, J' may be very efficiently made of wood. This provides an easy method for forming the irregular contour frequently required, as it is only necessary to take a board and saw it with a scroll or band saw along a line to correspond with the edge of the blank, one cut of the saw thus providing the coöperating contours of the two bars J, J'.

The bar J is adjusted in place by changing the position of its supporting bar $j$ as required and then screwing the bar J in place in the required position on the bar $j$. The bar $j$ is shown as offset forward so that a greater range of adjustment may be given it by turning it around to be in a position offset rearward. A number of holes are provided in the edge of the standards A for securing this bar. The bar J' is adjusted by employing shorter or longer spring straps $j'$ as required, or securing the bar to these straps at a different point. Inasmuch, however, as the blank is nearly dissevered when it reaches the bars J, J' it is not necessary that these bars be positioned with great accuracy.

As stated, the paper is fed forward intermittently by steps equaling the distance across the blank. I will now describe the mechanism for doing this, premising that I provide in addition to the intermittently operated immediate forwarder, a continuous feeding mechanism to supply the paper thereto. The paper Z comes from the continuous feed over a guide roll P, between set collars $p$ thereon, then between the feeding rolls Q', $Q^2$, and then over another guide roller R surmounted by coöperating rolls R' and fingers $R^2$, extending beneath the shaft of the roll R'. From this it results that if the roller $Q^2$ be rotated so that the upper portion of its periphery moves forward, the paper is drawn from the rear and shoved between the chase and its impression platen. Suitable means are provided to give the roller $Q^2$ such movement intermittently and timed so that the paper is fed forward while the reciprocating head is in the uppermost portion of its travel. The mechanism shown consists of the following: On a reduced extension of the shaft Q carrying the roll $Q^2$ is mounted a disk $q$ having recesses $q'$ in its periphery, in which seat rollers $q^2$, spring-pressed upward by springs $q^3$. The rollers thus engage the inner periphery of a flanged member or cup $q^4$ which is loosely journaled on the shaft. Owing to the incline of the recesses $q'$ and the springs $q^3$, if the member $q^4$ is rotated in the direction to drive the shaft Q forward, the rollers $q^2$ are jammed between the disk $q^7$ and member $q^4$ in causing the shaft to rotate. This feeds the paper. When, however, the member $q^4$ is moved in the opposite direction, then the rollers $q^2$ roll idly into deeper portions of their recesses and shaft Q is not rotated. Thus an alternate forward and back rotation of the cup $q^4$ is commuted into an intermediate but always forward rotation of the shaft Q.

To give the forward and back rotation to the cup $q^4$, I form on it a gear $q^5$, with which mesh rack teeth formed on a bar $q^6$. The lower end of this bar is secured eccentrically to the disk K, wherefore the rotation of the disk from the main shaft F reciprocates the rack bar $q^6$, and this intermittently feeds the paper. The rack bar is guided adjacent to the pinion $q^5$ by an embracing yoke $q^7$ carried by the shaft Q adjacent to the bracket $a'$ which forms the outermost bearing for the shaft. A plate $q^8$ is shown secured to the cup $q^4$ to retain the ratchet rollers in place.

In order to adjust the amount of paper fed forward on each yoke of the machine, I adjust the throw of the rack bar $q^6$. This I accomplish by mounting the crank pin $k'$ for the bar on a block which is carried in a slot $k^2$ in the disk K and forms a nut on a screw $k^3$. This screw is suitably held in place and has a projecting end by which it may be rotated to vary the position of the crank pin $k'$ and thus vary the throw of the link $q^6$.

As heretofore stated, the paper is continuously fed toward the machine before it is acted upon by the intermittent feed. This continuous feed, however, should be adjusted in the machine according to the intermittent feed, so that there will always be slack enough to provide for the intermittent feed without undue excess thereof. To accomplish this, I provide the following mechanism.

Referring to Figs. 1 and 2, T represents a roll on a shaft which is mounted in suitable standards $t$. Across this roll lies the web of paper, coming from a suitable supply, not shown. Pivoted in the standards $t$ is a rock shaft $t'$, to which are secured arms $t^2$, carrying a shaft $t^3$, on which is mounted a gripping roll T', which is similar to and coöperates with the roll T. Depending from the rock shaft $t'$ is an arm $t^4$ connected by a link $t^5$ with a hand lever $t^6$. The movement of this lever forward or backward thus swings the gripping roll T' toward or from the roll T to give the required grip to the paper according to the thickness thereof, or to throw the gripping roll out of action altogether. A suitable notch bar $t^7$ carried by the frame coöperates with the lever $t^6$ to hold it in any desired position. The roll T' is positively located to advance the gripped paper by means of a belt $t^8$ which takes on to a pulley $t^9$ on the end of the shaft $t^3$. This belt, being continuously driven, continuously feeds the paper forward when the roll T' is in position to grip it.

To govern the speed of the continuous feed, I provide the following mechanism. The belt $t^8$ surrounds and is driven by a pulley $u$ on a shaft U journaled in the frame standards A. On this shaft U is a wide conical-faced pulley $u'$ on which takes a belt $u^2$ from a complementary, reversely-placed conical pulley $u^3$ mounted on the shaft F. A belt shipper $u^4$ forks over the belt $u^2$ is slidable on a rod $u^5$ and has its upper end threaded to form a nut, which takes around a revoluble screw $u^6$. The rod $u^5$ and the screw $u^6$ are mounted in the frame standards A, the screw having a hand wheel $u^7$ on its end by which it may be rotated. The turning of this hand wheel, therefore, moves the shipper in one direction or the other, shifting the belt and changing the speed delivered from the shaft F to the shaft U, and hence to the continuous feed.

In order to adjust the stroke of the reciprocating head C to give just the right impression, as well as to provide means for throwing it out of action in case of emergency, I make the ends $d$, $d'$ of the shaft D, on which the bars D, D' are journaled eccentric of the shaft as shown. On the eccentric end, $d'$ are secured suitable retaining washers $d^2$, while on the end of the other eccentric is secured a lever V. This lever carries a hand piece $v$, which is connected by a rock arm and link with a sliding pawl V' on the lever. This pawl coöperates with any one of a series of notches in the segmental bar $V^2$ carried by the head C. Thus by the means of the hand piece $v$ the lever may be unlocked and swung to rock the shaft D, and thus by reason of the eccentric ends $d$, $d'$ change the effective length of the connection to the main shaft F. This provides an adjustment according to the thickness of paper, while if the lever V is swung to an extreme position the head C is maintained out of coöperation with the bed at the extreme lowest stroke, wherefore an emergency throwout is provided.

The lever V and the lever $t^6$ which may throw out the continuous feed are conveniently accessible to the attendant at the front of the machine, and if anything should become wrong he has simply to shove these levers rearward stopping the impression and the continuous feed. When the continuous feed has stopped the intermittent feed will slip frictionally on the paper.

Having described my invention, I claim:

1. In a machine for making paper box blanks, the combination of an impressing device, an intermittent feed therefor, a continuous feed to the intermittent feed, said continuous feed comprising a pair of gripping rollers and means for rotating one of them, a rock shaft, a pair of arms carried thereby, a shaft carried by said arms on which one of said rollers is mounted, a third arm secured to the rock shaft, a lever, and a link connecting the same with said third arm whereby the actuation of the lever varies the grip of said rollers.

2. In a machine for making paper box blanks, the combination of a suitably guided head, a shaft mounted therein, eccentric extensions for said shaft, bars journaled on said extensions for operating the head, a lever secured to one of said extensions for rocking said shaft, and means for locking said lever in various positions.

3. In a machine for making paper box blanks, the combination of a suitably guided head, a shaft mounted therein, eccentric extensions for said shaft, bars journaled on said extensions, a lever secured to one of said extensions for rocking said shaft, a locking segment carried by the head, a locking pawl carried by said lever, a main shaft, a pair of eccentrics thereon around which the lower ends of said bars take, and means for operating said main shaft.

4. In a machine for making paper box blanks the combination with a suitably guided head, reciprocating means for said head, a shaft journaled in said head and said reciprocating means, the respective bearings for the shaft therein being relatively eccentric, and means for rotating the shaft and holding it in different positions.

In testimony whereof, I hereunto affix my signature in the presence of two witnesses.

JOHN W. DENMEAD.

Witnesses:
E. L. THURSTON,
B. W. BROCKETT.